Feb. 5, 1946. P. SOBEK 2,394,337
DRIVING DEVICE FOR ROTARY PISTON MACHINES
Filed July 9, 1940 2 Sheets-Sheet 1
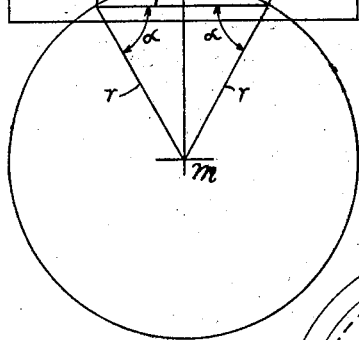
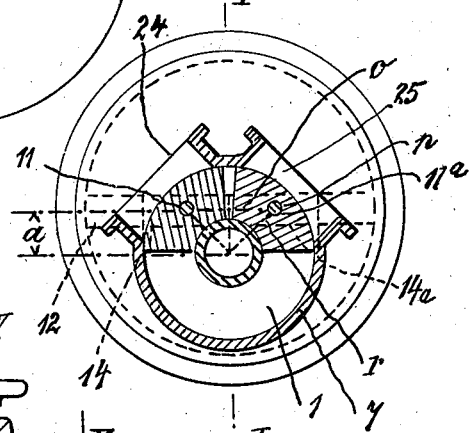
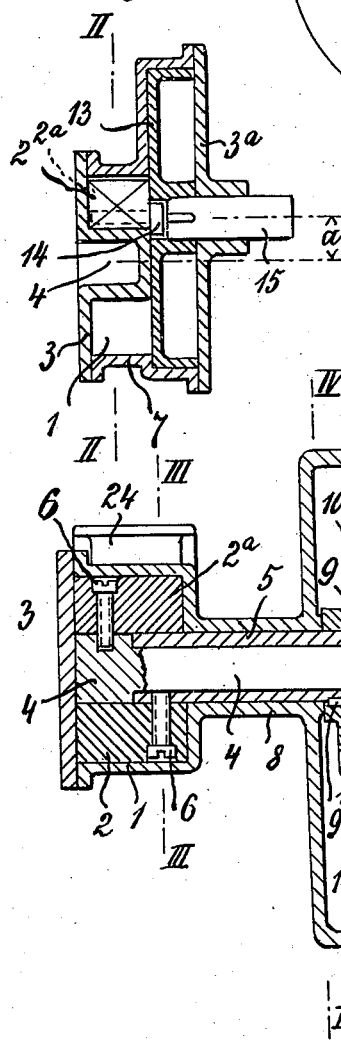

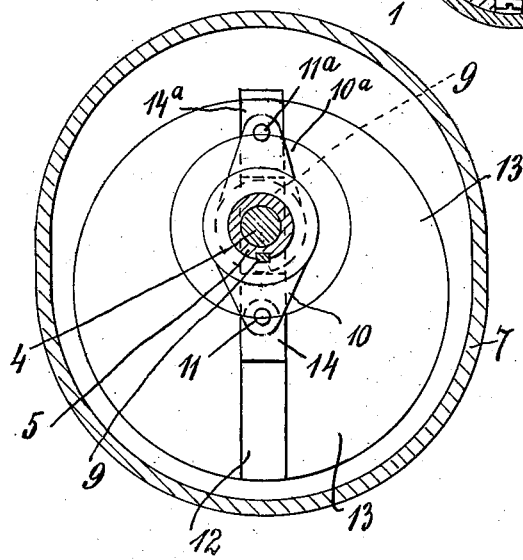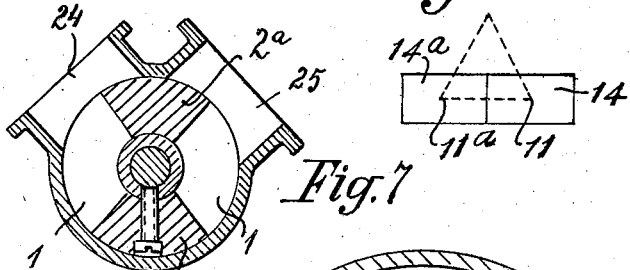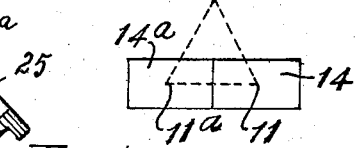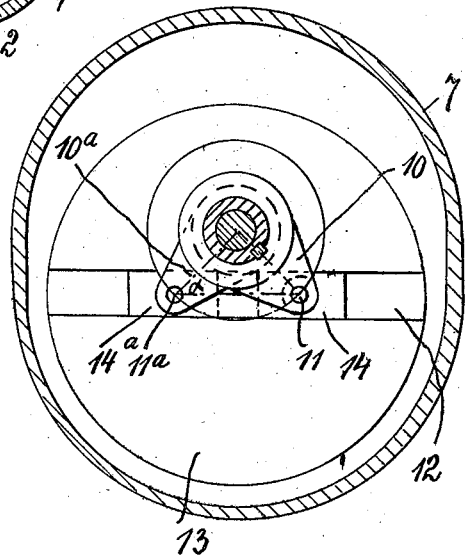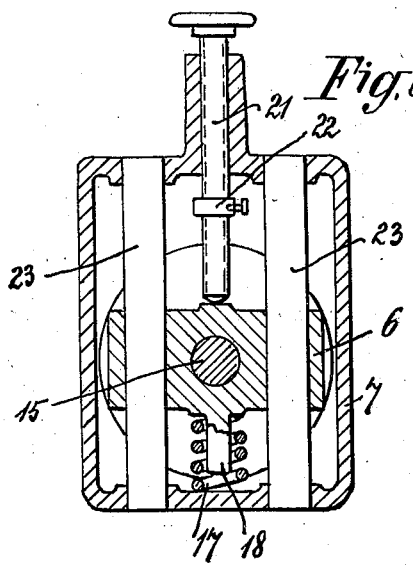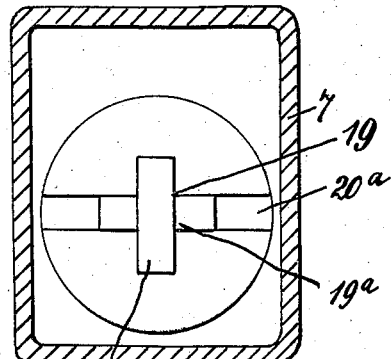

Patented Feb. 5, 1946

2,394,337

UNITED STATES PATENT OFFICE 2,394,337

DRIVING DEVICE FOR ROTARY PISTON MACHINES

Paul Sobek, Vienna 1, Austria; vested in the Alien Property Custodian

Application July 9, 1940, Serial No. 344,512

2 Claims. (Cl. 103—129)

In devices designed to drive the pistons of rotary machines, for instance, those having pistons, rotating at different angular velocity, the links supported eccentrically with respect to the axis of revolution of the piston often suffer from the disadvantage of the relation between driving member and piston being such that the forces (tangential forces) manifesting themselves and having to be overcome at the beginning of the operation under load grow to an intensity rendering the start of the machine extremely difficult. Besides, in that case, operation goes on under a distribution of forces not admitting of a correct equilibrium of same which exercises an unfavourable influence on the coefficient of efficiency.

The object of the present invention is a drive for the pistons of rotary machines, rotating at different angular velocities, characterized in that the middle of the line connecting the piston drive fulcra is placed at such a distance from the common center of rotation of the pistons that the piston axis form with that line an angle of not more than 60°, provided that the angles which they form with the connecting line of the piston drive fulcra be equal to each other. It is recommendable to arrange the piston drive fulcra in a disc covering an annular space of cylindrical shape, the said disc acting as driving device for the piston. However, the piston drive fulcra may also be slidably adjusted in a member displaceable in a straight line passing through the piston fulcrum. This member may, in a well known manner, be formed into a link supported on a slide. This design permits of the above mentioned angle being accurately adjusted according to requirements. But it is also possible to determine the angle by the length of blocks displaceable in the link and carrying the piston drive fulcra when the length of these blocks should not surpass the cosine of the angle multiplied by the distance of the piston drive fulcra from the common piston fulcrum.

The present application is a continuation in part of applicant's copending application Serial No. 217,832, filed July 6, 1938.

The drawings show two embodiments of the invention by way of example. Fig. 1 is a schematic diagram of the drive, Fig. 2 a section along the line I—I of Figure 3 through a driving device fitted with a link disc covering the cylindrical space, Fig. 3 is a section through the device along the line II—II of Fig. 2, whilst Fig. 4 is a longitudinal section through the axis of a device as per the invention provided with displaceable link axis and with a piston axis angle adjustable with regard to the link. Fig. 5 is a section along the line III—III of Fig. 4; the Figures 6 and 7 are sections along the line IV—IV of Fig. 4 at various operating positions of the pistons. Fig. 7 shows the arrangement, in which the piston drive fulcra are in the position determining the adjustable angle of 45°, and Fig. 7—a shows them in the positioning determining the adjustable angle of 60°. The Figures 8 and 9 are sections along the lines V—V and VI—VI of Fig. 4. In Fig. 1 $p$ is meant to signify the piston drive fulcra, $o$ the connecting line of the piston drive fulcra, $n$ the middle of the connecting line and at the same time the fulcrum of the driving member, $r$ the distance of the piston drive fulcra from the piston fulcrum and at the same time the piston axis, $\alpha$ the angle formed by the connecting line of the piston fulcrua and the piston axis, L the length of the length block in case of link drives.

If the piston axes $r$ are adjusted in such a manner that the angle $\alpha$ formed by same and the connecting line $o$ of the piston drive fulcra $p$ is less than 60°, the forces and accelerations manifesting themselves at the beginning of the work under load are bound to remain within a certain limit warranting a shock free operation of the rotary machine and a gradual transition in case of the change of velocity. On the other hand, the working or delivery space of these machines should be as large as possible for increasing their output. This aim can only be attained by having the angle $\alpha$ exceed the above mentioned limit. Consequently, it was hitherto impossible to warrant a shock-free operation. Hence, this type of machine was never yet of much practical use nor of adequate working capacity. In view of the fact that the pistons are rotating and not reciprocating, the shocks and the sudden increase of load were quite inexplicable. It was ascertained, however, that the above said disadvantages would suddenly disappear, when the output of the machine, e. g., the pump was reduced which was easily obtained by adjusting the angle. Thus it was found that the intensity of the shocks was influenced by the angle $\alpha$ which the piston axes $r$ form with the connecting line $o$ of the piston fulcra $p$. Experiments and tests have shown that the largest working space compatible with shock-free operation corresponds to an angle of 60°.

In the embodiment according to the Figs. 2 and 3 the cylindrical or working space 1 is formed by the casing 7, the bottom of the casing 3 and the crank or link disc 13 which is used for covering the space. The bottom 3 is provided with a cylindrical recess 4 extending as far as the link disc 13 and thereby forming the working space into an annular chamber. At the same time, by this design, an axle is formed, round which the pistons 2 and 2a are allowed to rotate. Fig. 3 shows the position of the pistons at which the angle $\alpha$ is obtained between the piston axis $r$ and the connecting line $o$ of the piston drive fulcra $p$. The link disc is provided with the groove 12 in which the blocks 14, 14a, supported by the pins 11, 11a are arranged. It is advantageous to fix the length of the link blocks in such a manner that they are in contact when the predetermined angle is formed by the axes. The casing containing the link disc 13 is closed by means of a cover 3a in which the driving shaft 15 is supported at a distance a from the axle 4 formed by the above mentioned casing recess. Furthermore, the casing carries the in- and outlet branches 24 and 25. The mode of operation is the same as with all rotary piston machines, i. e., the pistons rotating round their common axes alternately retire from each other and approach each other, this sucking and discharging in turn, the maximum output being obtained by shockfree operation as the axis 4 and 15 are placed at the maximum distance admissible in regard to the angle α which should not exceed 60°.

The Figures 4–9 show a rotary piston pump whose axis 4 and 15 permit of an adjustment of their distance a. The pistons 2, 2a are located in the working cylinder 1 provided with the usual pump-in and outlet branches 24, 25. The one of these pistons 2a is fastened on a solid shaft 4 extending to the bottom 3 of the working cylinder, whilst the other piston 2 is fixed by screws on a hollow shaft 5 slid on the solid shaft mentioned. The hollow shaft is supported by the bearing 8 connecting the piston drive casing 7 and the cylinder 1. At the end opposite to the cylindrical space or chamber each of the two shafts carries an arm fastened to it by means of a key 9, viz. the solid shaft the arm 10a and the hollow shaft the arm 10. These arms are employed as cranks for driving the respective pistons. For this purpose they are fitted with pins 11a and 11 on which the blocks 14a, 14 are allowed to rotate. These blocks are, at the same time, slidably arranged in the groove 12 of a link disc 13 and are preferably of such a size that their length L be equal to the double of the cosine of 60° multiplied by the distance r (Fig. 1) of the piston axis fulcrum p from the common piston fulcrum m.

The blocks by touching each other, as shown in Fig. 7—a, determine the adjustment of the link and, in consequence, also that of the piston axes with a view of obtaining the greatest angle admissible. The crank or link disc 13 is carried by the shaft 15, the latter being supported by an adjustable bearing 16. This bearing rests on a spring 17 and is guided in same by the columns 23 and by the pin 18 formed downwards into a stop. It is acted upon by a screw 21 adjustable in the casing 7, on which an adjustable stop 22 is provided, the stop serving for limiting the progress of the screw as well as the adjustability of the bearing and that of the angle formed by the piston axes. However, this limitation may also be obtained by other means. In any case a limiting device or stop should be provided. The shaft 15 is connected with the driving shaft proper 27 by a slip coupling 28, 28a, which permits of an adjustment of the shaft 15 perpendicularly to the groove 12 of the link by means of a cross 19 consisting of two beams 19a, 19b, the cross beams being made slidable in the grooves 20, 20a of the coupling parts 18, 18a.

The mode of operation of the device is the following. The machine is driven from the shaft 27. Through the coupling 28, 28a the movement is transmitted to the shaft 15 adjustable by means of the bearing 16, the shaft 15 rotating the link disc 13 which is fastened to it. Thereby the blocks 14, 14a arranged in the groove 12 of this disc and carried by the pins 11, 11a of the arms or cranks 10, 10a are forced to execute rotary and reciprocating motions. The arms 11, 11a will transmit these motions to the respective shafts 4 and 5 which, in their turn, are made to actuate the pistons 2, 2a. The distance of the axes of the shafts 4, 5 on one hand and 15 on the other is the factor which, in combination with the arms whose axes correspond to the axes of the pistons, determines the maximum angle α forming between the latter. As stated above this angle should in no case exceed 60°, provided that the axes are symmetrically adjusted with respect to the connecting line o. By means of the screw 21 and the spring 17 cooperating with same the bearing 16 and, hence, also the shaft 15 may be adjusted until the collar 22 touches the casing wall or until the blocks are made to contact, provided they have the length mentioned above. In consequence of the adjustment of the shaft 15 the cross 19 will slide in the coupling parts 28, 28a, thus warranting an exact transmission of the rotation from the shaft 27 on to the shaft 15.

The output of the machine depends on the distance a of the shaft axis 4, 5 from the shaft axis 15 i. e. on the value of the angle α considering the increase or reduction of the operating or working space 1 enclosed between the pistons and the cylinder.

Having now fully described the nature of my invention and in what manner same is to be performed, I herewith state that what I claim is:

1. A rotary machine for use as a pump or motor and including an annular working chamber having an inlet and an outlet, a pair of pistons coaxial with said chamber and rotatable circumferentially in said chamber, a drive member rotatable about an axis eccentric to said chamber and pistons, a crank drive between said drive member and each of said pistons and including a pivotal connection slidable in said drive member radially in respect to the axis of rotation of said drive member, the angles between the line connecting the centers of said pivotal connections and the lines connecting the centers of said pivotal connections and the axis of rotation of said pistons being 60° when the parts are in such position that said angles are equal.

2. A rotary machine for use as a pump or motor and including an annular working chamber having an inlet and an outlet, a pair of pistons coaxial with said chamber and rotatable circumferentially in said chamber, a drive member rotatable about an axis eccentric to said chamber and pistons, and a crank device between said drive member and each of said pistons, and including a pivotal connection having a respective block slidable in the drive member radially in respect to the axis of rotation of said drive member, the length of each of said blocks from its pivotal axis to the end of said block nearest the other block being the cosine of 60° multiplied by the distance from said pivotal axis to the axis of rotation of said pistons, whereby the angles between the line connecting said pivotal axes and the lines connecting said axes and the axis of rotation of said pistons are 60° when the parts are in such position that said angles are equal, and the adjacent ends of said blocks are in contact.

PAUL SOBEK.